United States Patent [19]
Park

[11] Patent Number: 5,433,652
[45] Date of Patent: Jul. 18, 1995

[54] GLASS SHEET PARTIAL CHAMFERING MACHINE

[76] Inventor: Kyung Park, 305-1109 Jugong Apt. 670, Daichi-Dong, Kangnam-Ku, Seoul, Rep. of Korea

[21] Appl. No.: 180,563

[22] Filed: Jan. 12, 1994

[30] Foreign Application Priority Data

Apr. 14, 1993 [KR] Rep. of Korea ................ 6626/1993

[51] Int. Cl.⁶ .............................................. B24B 7/04
[52] U.S. Cl. ......................................... 451/9; 451/10; 451/11; 451/24; 451/289; 451/285; 451/283; 451/44
[58] Field of Search ...................... 51/109 R, 128, 129, 51/131.1, 131.5, 165.74, 165.75, 165.76, 165.77, 165.9, 283 R, 283 E, 102, 103 R, 105 R, 107

[56] References Cited

U.S. PATENT DOCUMENTS

| | | | |
|---|---|---|---|
| 4,989,373 | 2/1991 | Park | 51/131.7 |
| 5,028,182 | 7/1991 | Park | 51/235 |
| 5,074,079 | 12/1991 | Park | 51/165.77 |
| 5,265,382 | 11/1993 | Park | 51/283 E |

*Primary Examiner*—Bruce M. Kisliuk
*Assistant Examiner*—Eileen P. Morgan
*Attorney, Agent, or Firm*—Palmatier, Sjoquist & Helget

[57] ABSTRACT

The present invention discloses a glass sheet chamfering machine which is improved such that it is suitable for a partial chamfering for a glass sheet. In the conventional glass sheet chamfering machine, and in carrying out a partial chamfering with this conventional machine, at the moment when one of the two glass sheet shape sensing rollers departs from the end point of the glass sheet, one of the rollers is turned to the direction of the straight edge, so that the chamfering wheel is also automatically turned. Consequently, the chamfering direction is deviated, with the result that the chamfering becomes impossible, or a defective chamfering is generated. The present invention eliminates such conventional disadvantage, by arranging that, even if one of the two rollers departs from the corner, the chamfering wheel is not turned. A horizontal supporting pad 20 mounts a glass sheet shape sensing device 19, and also mounts an adjusting key control plate 26 which is provided with an adjusting key guide slot 27, an adjusting key end portion 25a being pivoted through the adjusting key guide slot 27. Under the supporting pad 20, there is installed a pneumatic cylinder 28 for fixing an adjusting key 25. The pneumatic cylinder 28 is actuated through numeric controls, and the adjusting key 25 is controlled by the pneumatic cylinder 28, so that the glass sheet shape sensing device 19 should be fixed or released at exactly required positions. Thus the chamfering machine of the present invention carries out a partial chamfering automatically and continuously.

3 Claims, 14 Drawing Sheets

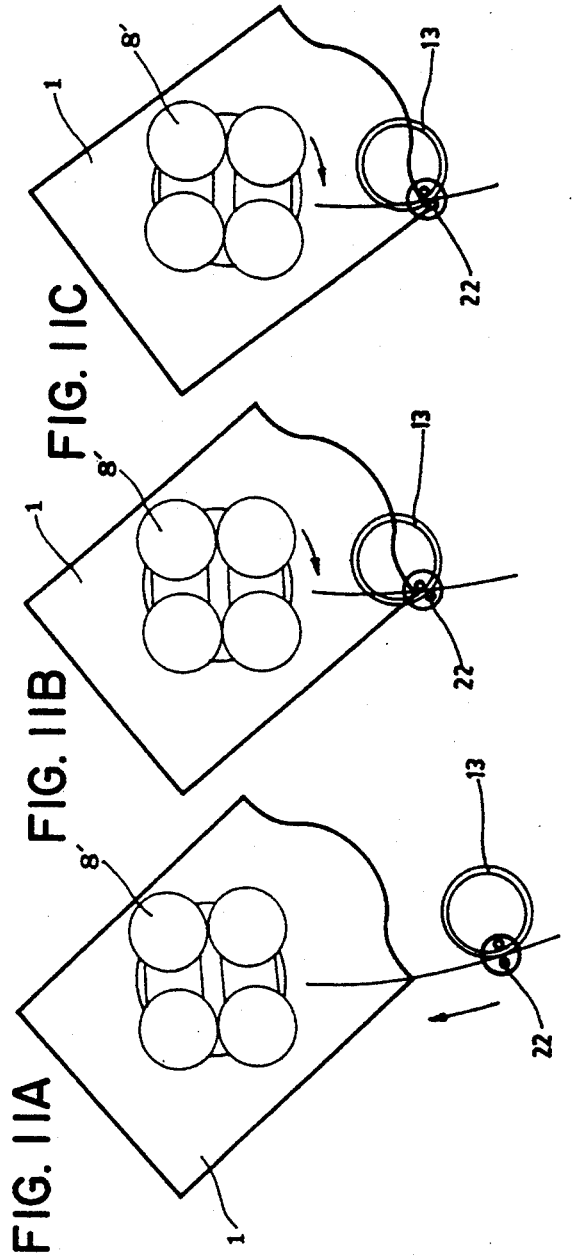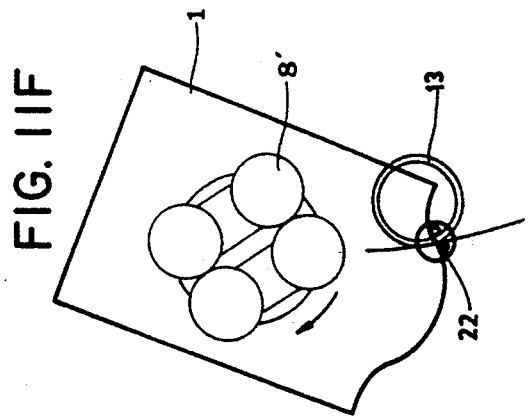

GLASS SHEET PARTIAL CHAMFERING MACHINE

FIELD OF THE INVENTION

The present invention relates to a glass sheet partial chamfering machine. The glass sheet chamfering machine performs a bevelling or edging on the sharp edges of a glass sheet which has been cut into various contours, so that the edge of the glass sheet should become safe and should look beautiful. The chamfering of a glass sheet consists of: the case where the whole edge of the glass sheet is chamfered as shown in FIGS. 6A and 6B; and the case where the curved parts of the edge of the glass sheet are chamfered as shown in FIG. 6C. The present invention relates to a glass sheet chamfering machine which is capable of chamfering the curved edges of a glass sheet in an easy and speedy manner (the straight edges are chamfered by a straight chamfering machine). The present invention is an improvement of Korean Patent Application No. 91-3090 which was filed on Feb. 26, 1991 by the present applicant, and which was entitled "Apparatus for Numeric-controlling Chamfering Positions in Glass Sheet Chamfering Machine".

BACKGROUND OF THE INVENTION

To see into the chamfering methods of the conventional glass sheet chamfering machines, the following method is used in the case where the whole edge of a glass sheet is chamfered as shown in FIGS. 6A and 6B. That is, a glass sheet to be chamfered is secured on a suction table, and then, a value 2000 is inputted into a numeral setting panel of a numeric control counter. Then if a start switch is turned on, the glass sheet on the rotary suction table slowly revolves, and, at the same time, a chamfering wheel motor which has been advanced toward the edge of the glass sheet fast revolves to start chamfering. Then the value of the numeric display panel of the counter is continuously incremented in accordance with the revolutions of the rotary suction table, and, when this value corresponds to the pre-inputted value 2000, a switch is activated by an output signal of the counter, so that the rotary suction table and the chamfering motor should be stopped. Then the chamfering wheel head is withdrawn to be put to a standby position, thereby completing two rounds of crude chamfering. Then, the crude chamfering wheel of the chamfering motor is replaced with a medium crude chamfering wheel, and then, two rounds of medium crude chamfering are carried out. Then the medium crude chamfering wheel is replaced with a fine chamfering wheel, and then, two rounds of fine chamfering are carried out. Then the fine chamfering wheel of the chamfering motor is replaced with a fine grinding wheel, and then, two rounds of fine grinding are carried out, thereby completing the bevel-chamfering of the edge of the glass sheet.

In FIGS. 6A, 6B and 6C, reference code 1 indicates a glass sheet, and 1a indicates the bevel-chamfered face. Here, the crude chamfering, the medium crude chamfering, the fine chamfering and the fine grinding are carried out respectively twice or more by turning the rotary suction table in accordance with the numeric control of the counter, so that the face of the bevel-chamfering should be sufficiently wide, and that a high chamfering quality should be assured.

Meanwhile, when the curved parts of the edge of a glass sheet is to be chamfered as shown in FIG. 6C, the crude chamfering, the medium crude chamfering, the fine chamfering and the fine grinding are sequentially carried out twice. However, in this case, the chamfering cannot be carried out continuously twice unlike the case where the whole edge is chamfered. In this case, the chamfering is carried out twice discontinuously from the starting point S to the ending point E.

Therefore, the revolution angles between the chamfering starting point S to the chamfering ending point E should be known numerically. For this purpose, a glass sheet is secured on the rotary suction table, and then, a chamfering wheel head 10 is made to advance toward the edge of the glass sheet.

Then, by turning the rotary suction table, the chamfering starting point S is made to be positioned at the middle of two shape sensing rollers 22 which are located below the chamfering wheel 13 as shown in FIG. 7A. Then, a reset button of the counter is pressed to clear the value of the numeric panel to "0000". Under this condition, the operator grasps an adjusting key handle 25b of a chamfering direction indicating device, and one of the two shape sensing rollers 22 is made not to revolve in the longitudinal direction at the sharp angle of the chamfering starting point of the glass sheet. If one of the two rollers revolves in the longitudinal direction at the starting point S as shown in FIG. 7B, the chamfering head 10 itself automatically revolves, so that the chamfering direction should become wrong so as for the chamfering to be impossible, or that a defective portion 2' is generated as shown in FIG. 7C. Therefore, the operator should make sure that the two glass sheet shape sensing rollers should be disposed in parallel with the chamfering advancing direction as shown in FIG. 7A by adjusting the adjusting key handle 25b, so that the advancing direction of the chamfering wheel should be parallel with the chamfering advancing direction.

Under this condition, if a switch for forward revolution is turned on, the glass sheet which is secured on the rotary suction table slowly forwardly revolves. Simultaneously, the value of the numeric panel of the counter is incremented starting from "0". When the two glass sheet shape sensing rollers contact with the lateral face as shown in FIG. 7D, the operator releases the adjusting key handle.

From this point, a glass sheet shape sensing device 19 senses the shape of the glass sheet, and the wheel head itself automatically maintains the optimal chamfering direction. The glass sheet continuously revolves, and the value of the counter is continuously incremented. However, when the chamfering ending point comes to be located at the middle of the two sensing rollers, the operator turns off the revolution switch to stop the revolution of the rotary suction table, while holding the adjusting key handle. Then, if the numeric display panel is looked into, there is found a numeric value which is the sum of the revolution angles between the chamfering starting point to the chamfering ending point. This numeric value is inputted into a setting panel of the counter, and then, a reverse switch is turned on, so that the table should revolve reversely. During this procedure, the value of the numeric display panel is decremented until the rotary suction table stops at the value "0", and the chamfering starting point of the glass sheet comes to be positioned at the middle of the two glass sheet shape sensing rollers. At this point also, the operator has to hold the adjusting key handle.

Thus the whole numeric value of the revolution angles are all inputted from the chamfering starting point to the chamfering ending point of the glass sheet to be partially chamfered, thereby making ready for the partial chamfering.

The operator lowers the wheel motor which has been lifted, and turns on the start switch while holding the adjusting key. Then the wheel motor of the wheel head and the rotary suction table revolve, and the chamfering fluid is supplied, thereby starting the partial chamfering. When the two glass sheet shape sensing rollers contact on the lateral face of the chamfering starting point, an automatic chamfering is let to be carried out by releasing the adjusting key. At the same time, the numeric display panel increments its value starting from "0", and when the value on the numeric display panel corresponds with the pre-set value, then an output signal of the counter causes the supply of the cooling fluid to be stopped, and the wheel head to be withdrawn. Also the rotary suction table is rotated reversely, and the numeric display panel shows decrements of its value until it reaches "0" whereupon the rotary suction table is stopped and the system returns to the chamfering starting point.

Again, the operator turns on the advancement switch, while making the chamfering direction of the glass sheet and the chamfering direction of the wheel head be parallel by adjusting the adjusting key. Then the wheel head advances toward the glass sheet, and the operator turns on the start switch while making one of the sensing rollers contact with the lateral face of the chamfering starting point, thereby starting a partial chamfering again. Thus the partial chamfering is carried out, and when the displayed numeric figure corresponds with the pre-set numeric figure, the supply of the cooling fluid is stopped, while the wheel head is withdrawn to be put to a standby position. Then the rotary suction table is rotated reversely to return to the chamfering starting point in an automatic manner.

Thus the two rounds of the crude chamfering is completed, and then, the crude chamfering wheel is replaced with a medium crude chamfering wheel. Then the medium crude chamfering is carried out twice in the above described manner. Then the medium crude wheel is replaced with a fine chamfering wheel, and then, a fine chamfering is carried out twice in the above described manner. Then the fine chamfering wheel is replaced with a fine grinding wheel, and then, a fine grinding is carried out twice in the above described manner.

Thus, when the rotary suction table which secures a glass sheet revolves forwardly (clockwise), the value of the numeric display panel is incremented, while, during its reverse revolution, the numeric value is decremented. As described in Korean Patent Application 91-3090 which was filed by the present applicant, a counter adds or subtracts as much as the pulse signals which are generated in accordance with the revolutions of an encoder which is installed in such a manner as to be rotated together with the shaft of the rotary suction table. Thus the numeric display panel displays numeric value in order to show the revolution angles of the glass sheet of the rotary suction table in a numeric value. The shaft of the rotary suction table and the shaft of the encoder are installed in one to one ratio, and therefore, one revolution of the encoder represents 1000 pulses, while thus one revolution of the rotary suction table represents an angular value of 1000. Further, the machine operates in accordance with the on and off signals of a switch which is installed on the counter, and which is activated when a correspondence between the inputted numeric value and the pre-set numeric value the inputted value is encountered.

Thus, in carrying out a glass sheet edge partial chamfering, the crude chamfering is carried out twice, the medium crude chamfering is carried out twice, the fine chamfering is carried out twice, and the fine grinding is carried out twice. In this procedure, the rotary suction table revolves eight times forwardly and eight time reversely, and the chamfering wheel performs forward advancements eight times and withdrawing eight times, this being a complicated procedure. Further, in this procedure, the adjustments of the adjusting key have to be carried out sixteen times at the chamfering starting point and the chamfering ending point, this being a troublesome task.

SUMMARY OF THE INVENTION

Therefore it is the object of the present invention to provide a glass sheet partial chamfering machine, in which the machining procedure is simplified, and the speed of the machining is made faster.

In achieving the above object, the present invention is characterized in that: after the completion of the first round of chamfering, the wheel head is directly shifted to forward advancement; and during the reverse advancement, the chamfering is carried out like during the forward advancement, so that the chamfering quality same as that of the conventional chamfering can be achieved with four rounds of forward chamfering, four rounds of reverse chamfering, or four times of forward advancements of the chamfering wheel, and four times of reverse advancements of the chamfering wheel. Further, even if the operator does not adjust by holding the adjusting key, a glass sheet shape sensing device is automatically activated, so that the glass sheet shape sensing device is not rotated at the both corners of the chamfering starting point and chamfering ending point as shown in FIG. 8.

BRIEF DESCRIPTION OF THE DRAWINGS

The above object and other advantages of the present invention will become more apparent by describing in detail the preferred embodiment of the present invention with reference to the attached drawings in which:

FIG. 6 illustrates the types of glass sheets to be chamfered, in which.

DESCRIPTION OF THE PREFERRED EMBODIMENT

Figure 1:
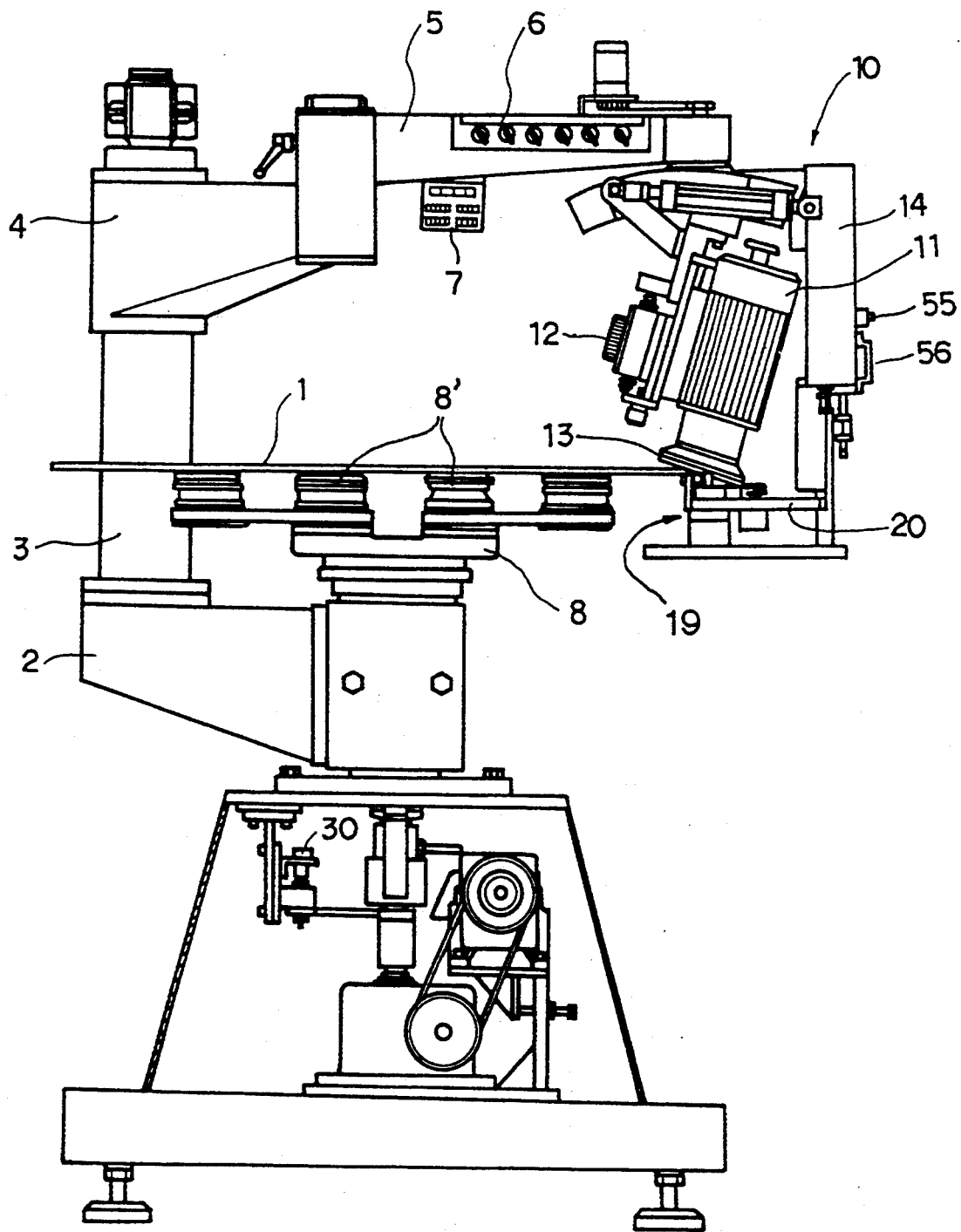
FIG. 1 is a side elevational view of the glass sheet partial chamfering machine according to the present invention.
Figure 2:
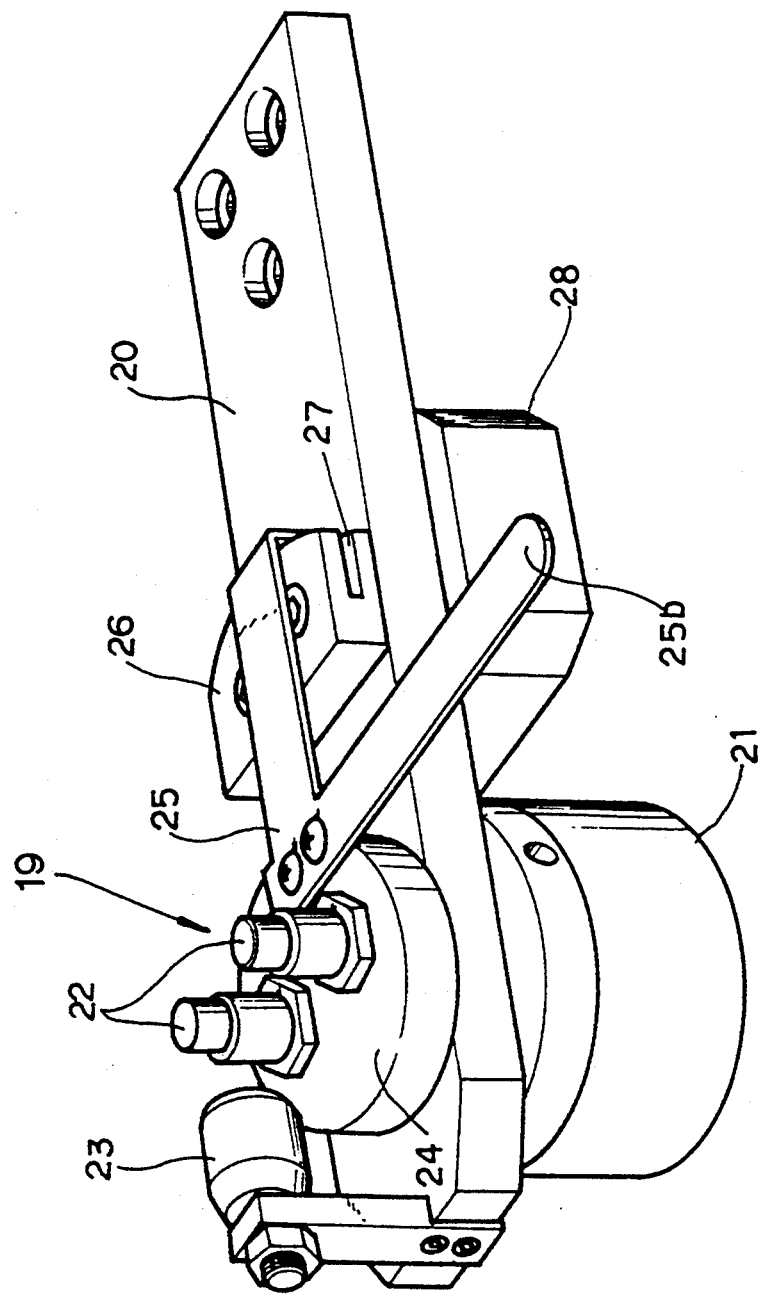
FIG. 2 is a perspective view showing the critical portion of the machine according to the present invention.
Figure 3:
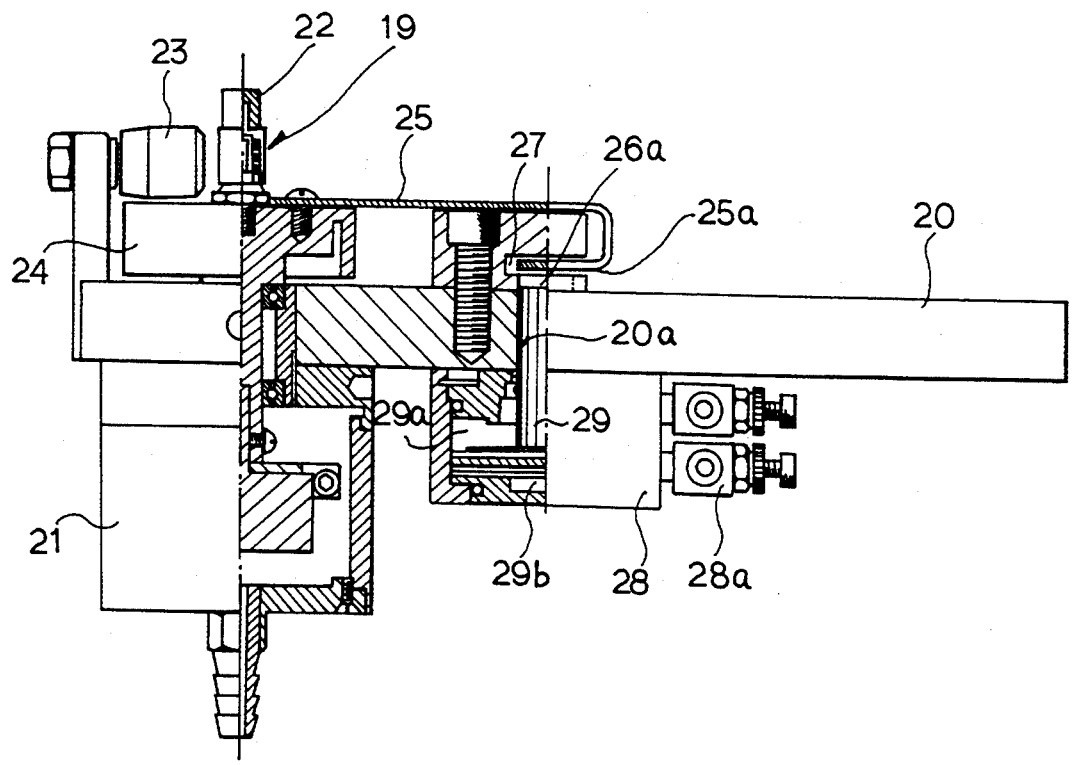
FIG. 3 is a sectional view of the device of FIG. 2.
Figure 4:
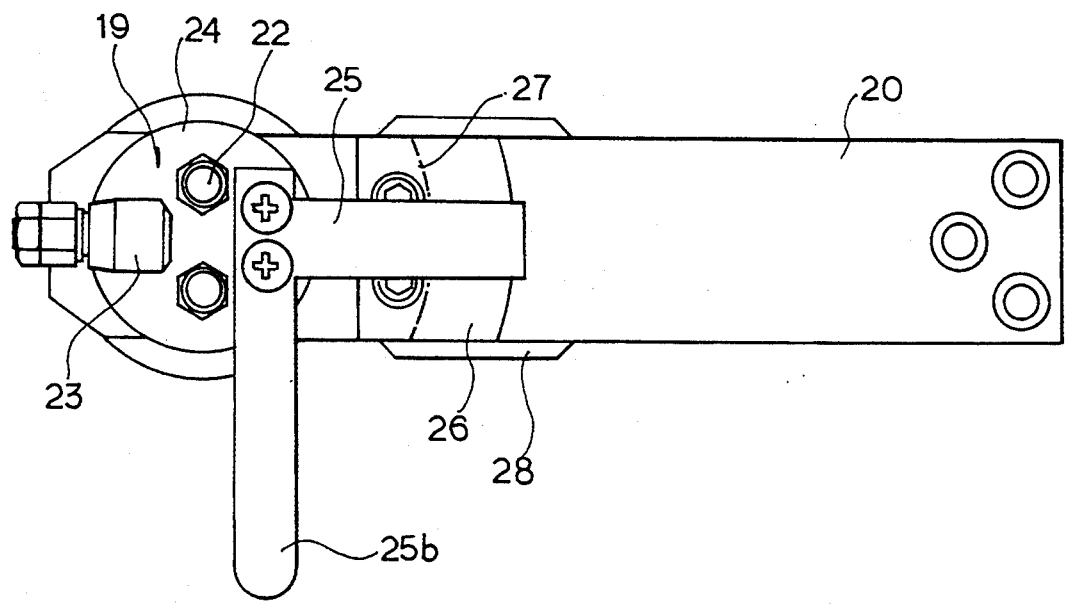
FIG. 4 is a plan view of the device of FIG. 2.

The glass chamfering machine according to the present invention includes: a horizontal beam 2 installed to the center of the base body of the machine; a vertical pole 3 installed on the end of the horizontal beam 2; and first and second joint beams 4 and 5. Further, a chamfering head 10 is suspended from the end of the second joint beam 5, and the second joint beam 5 is provided with a counter 7 which has one numeric display panel and four numeric setting panels, in place of the conventional counter having one numeric display panel and two numeric setting panels. A horizontal supporting pad 20 mounts a glass sheet shape sensing device 19, and a shaft hole 20a passes vertically through an intermediate portion of the horizontal supporting pad 20. A pneumatic cylinder 28 is installed under the shaft hole 20a, in such a manner that a rod 29 of the pneumatic cylinder 28 should pass through the shaft hole 20a. Further, an adjusting key control plate 26 is installed upon the shaft hole 20a of the horizontal supporting pad 20, and the adjusting key control plate 26 is provided with an adjusting key guide slot 27 in the horizontal direction. Further, the adjusting key control plate 26 is provided with a rod insertion hole 26a downwardly from the adjusting key guide slot 27, and which is aligned with the shaft hole 20a straightly. A circular supporting base 24 is provided with two glass sheet shape sensing rollers 22, and is further provided with an adjusting key 25 which includes handle portion 25b and a U shaped bent end portion 25a. The end portion 25a surrounds the upper portion of the adjusting key control plate 26, and is inserted into the adjusting key guide slot 27 to be pivoted therein.

Figure 5:
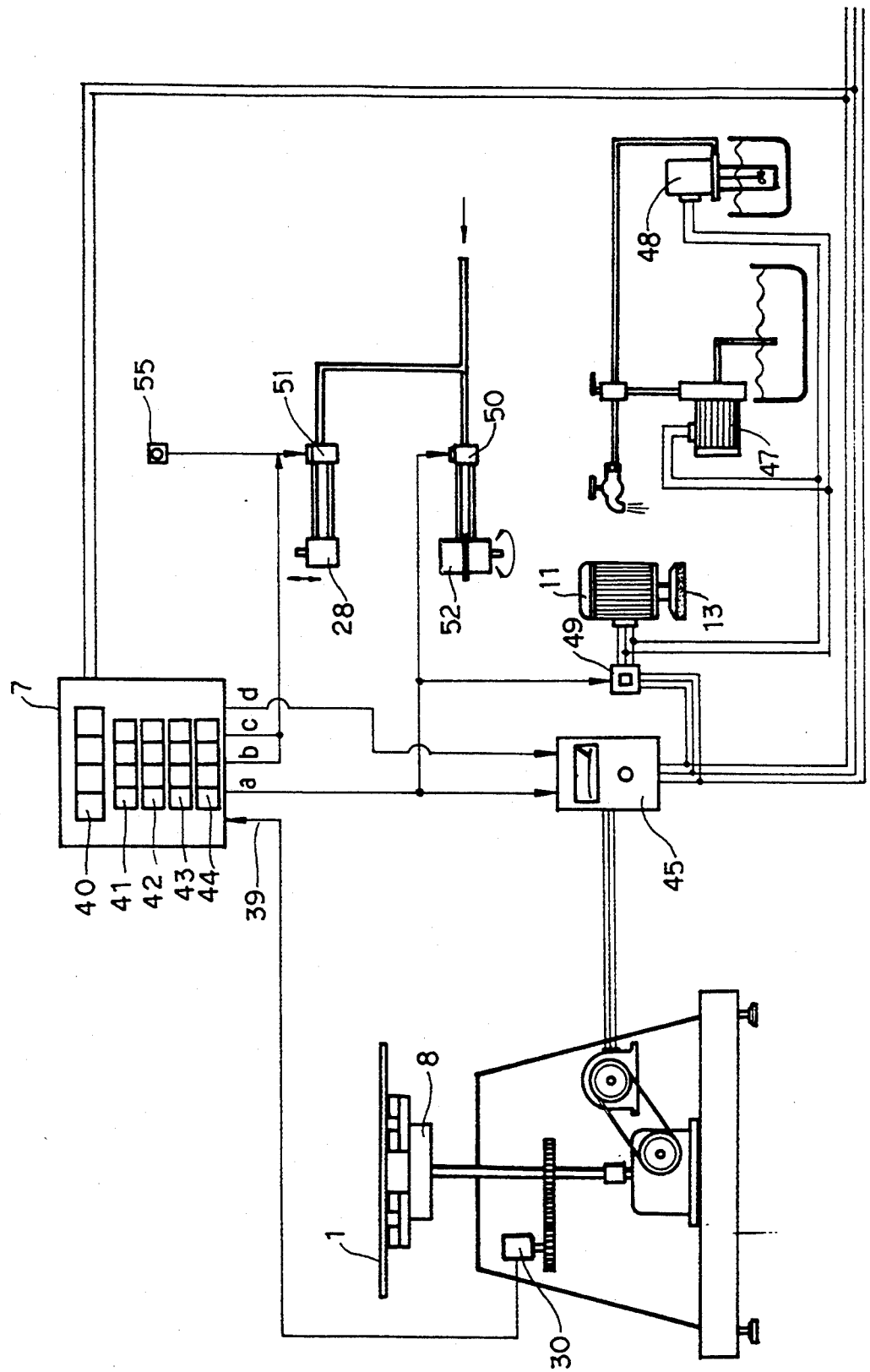
FIG. 5 illustrates the electrical connections of the chamfering machine according to the present invention.
Figure 6A:
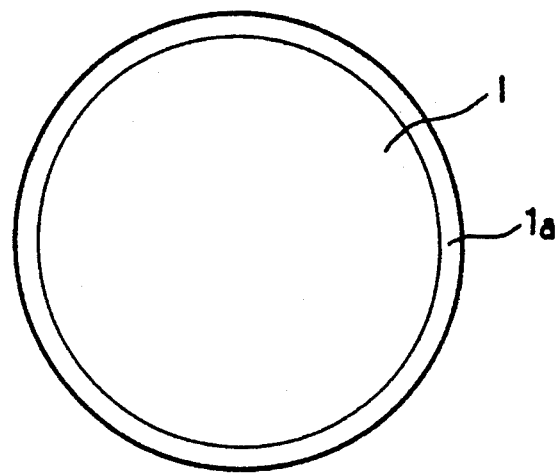
FIGS. 6A and 6B are circular and elliptical glass sheets for being chamfered on the whole edges.
Figure 6B:
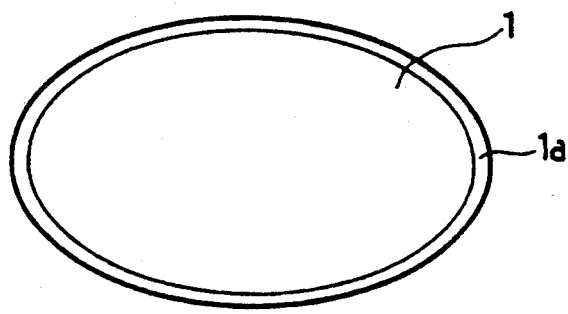
Figure 6C:
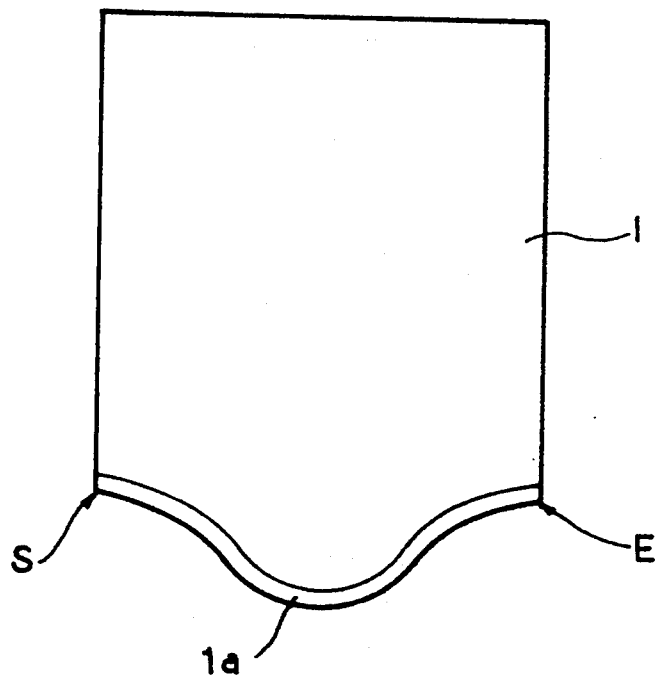
FIG. 6C illustrates a glass sheet to be partially chamfered.
Figure 7A:
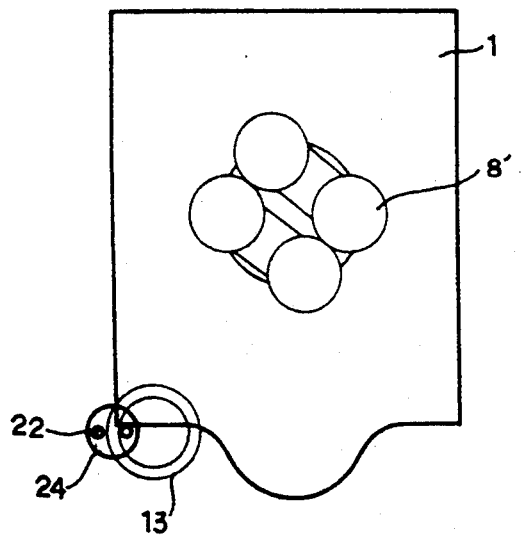
FIG. 7 illustrates the problems encountered in the conventional machine.
Figure 7B:
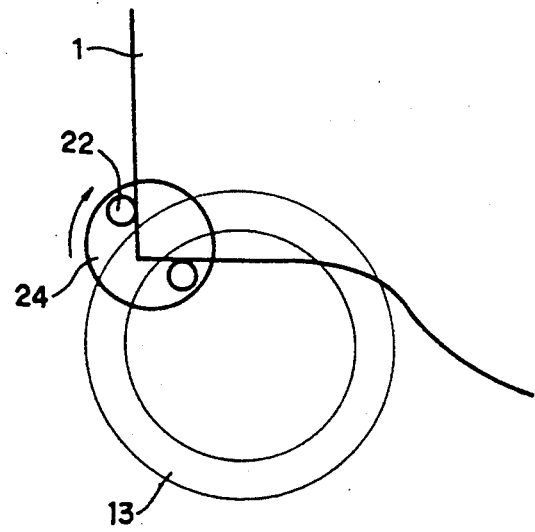
Figure 7C:
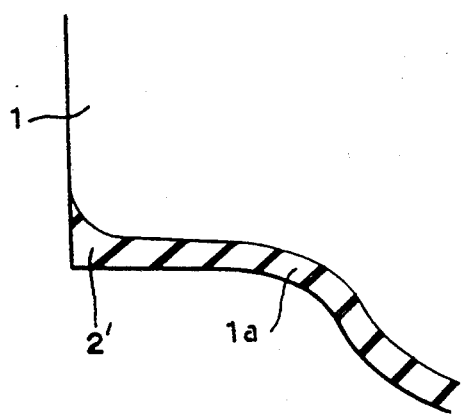
Figure 7D:
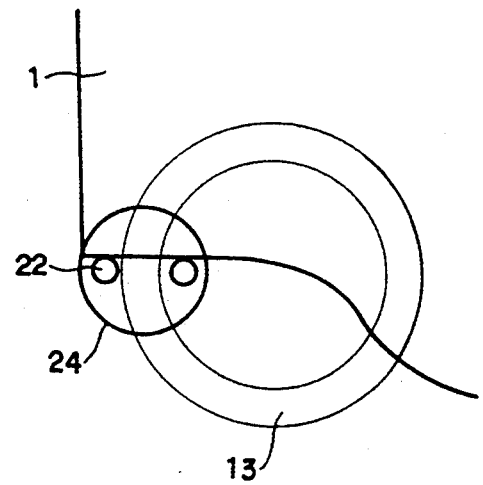
Figure 8:
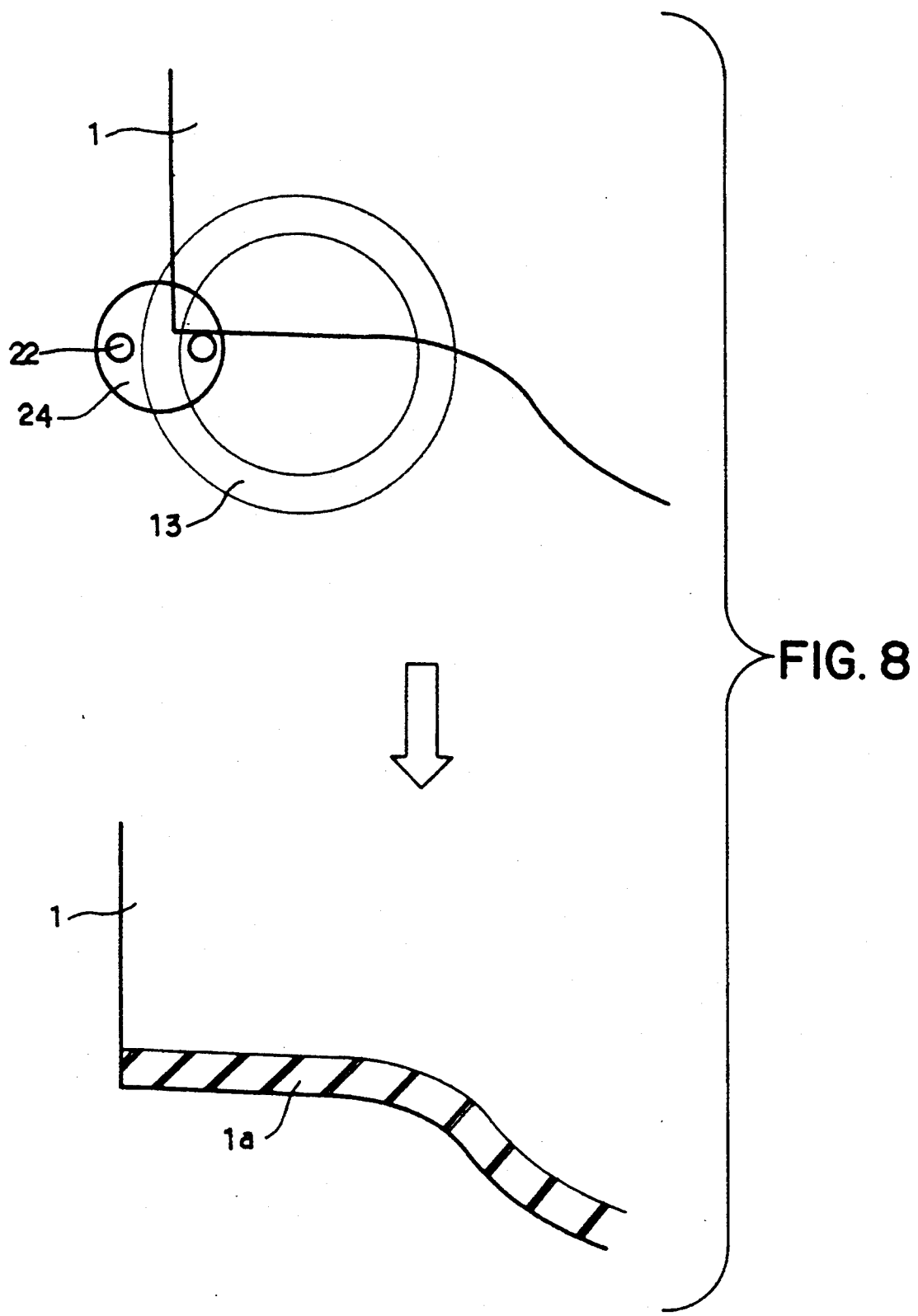
FIG. 8 illustrates the procedure of partially chamfering with the machine according to the present invention.

A vertical supporting bar 14 of the chamfering wheel head 10 is provided with a button switch 55 which is for securing the whole unit of the glass sheet shape sensing device, and which is disposed near an operating handle 56. As shown in FIG. 5, a signal input terminal 39 of the counter 7 is electrically connected to an encoder 30 which generates pulse signals in accordance with the revolutions of the rotary suction table 8. In accordance with the forward and backward revolutions of the rotary suction table 8, angular values in which one revolution of the table is represented by 1000 are inputted into a numeric display panel of the counter to be added or subtracted.

An output terminal a of a first numeric setting panel 41 of the counter 7 is electrically connected to an invertor 45 which controls the revolutions of the rotary suction table. The invertor 45 is also electrically connected to a chamfering wheel motor 11, a cooling fluid circulating pump 47 and an electronic switch 49, the switch 49 turning on and off a grinding fluid circulating pump 48. Further, the invertor 45 is electrically connected to a solenoid valve 50 which supplies a pneumatic pressure to a rotary cylinder 52 which makes the chamfering wheel motor move forward and backward. Thus when the numeric value of the chamfering ending signals of the first numeric setting panel and the numeric value of the revolution angle of the rotary suction table 8 correspond with each other, the rotary suction table 8 stops at the accurate position by receiving an electric signal from the counter 7. At the same time, the chamfering wheel motor 11 also stops, and the supply of the cooling and grinding fluids stops, while the chamfering wheel head 10 is withdrawn to be put to a standby position.

An output terminal b of a second numeric setting panel 42 of the counter 7 is electrically connected to a solenoid valve 51 which supplies a pneumatic pressure to the pneumatic cylinder 28 which fixes or releases the glass sheet shape sensing device 19. When the fixing or releasing numeric value of the second numeric setting panel 42 and the numeric value of the revolution angle of the rotary suction table 8 correspond with each other, the glass sheet shape sensing device 19 is fixed or released at the exact position by receiving an electric output signal of the counter 7.

An output terminal c of a third numeric setting panel 43 of the counter 7 is electrically connected to the solenoid valve 51 which supplies a pneumatic pressure to the pneumatic cylinder 28 which fixes or releases the glass sheet shape sensing device 19. When the fixing or releasing numeric value of the third numeric setting panel 43 and the numeric value of the revolution angle of the rotary suction table 8 correspond with each other, the glass sheet shape sensing device 19 is fixed or released at the exact position by receiving an electric output signal from the counter 7 in the same way as that of the second numeric setting panel.

An output terminal d of a fourth numeric setting panel 44 is electrically connected to the invertor 45 which controls the revolutions of the rotary suction table 8 like the case of the first numeric setting panel. 41. When the reverse revolution signal numeric value of the fourth numeric setting panel and the numeric value of the revolution angle of the rotary suction table correspond with each other, the counter 7 supplies an electric signal to the invertor 45, so that the rotary suction table should be shifted from the forward revolution to the reverse revolution at the exact position.

In the device of the present invention constituted as described above, if the numeric value for the portion of the glass sheet to be chamfered is inputted, then the chamfering is automatically carried out.

Figure 9A:
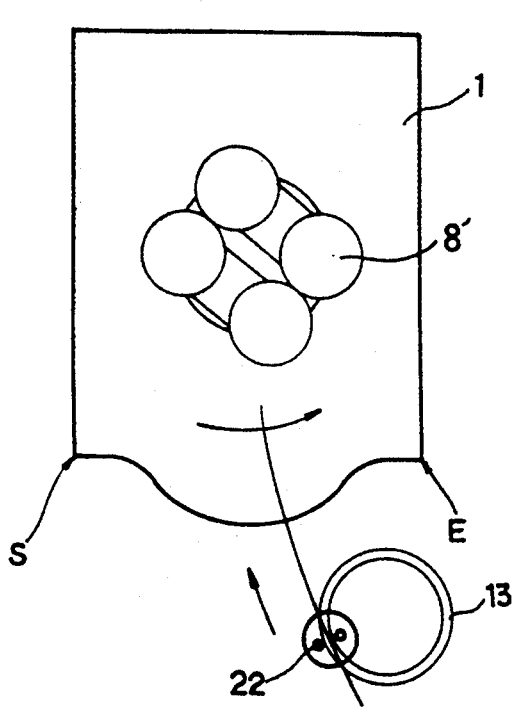
FIGS. 9A to 9L illustrates the method of inputting numeric values for chamfering with the machine according to the present invention.

Now the inputting of the numeric value for the portion of a glass sheet to be chamfered will be described, (1) A glass sheet i to be partially chamfered is secured upon the rotary suction table 8, and then, the chamfering wheel motor 11 is lifted, in such a manner that the chamfering wheel 13 should not touch the glass sheet 1. Then a numeric value "0001" is inputted into the first numeric setting panel 41 of the counter 7. This is for outputting a signal by taking into account the inertia, so that, during the reverse revolutions, the diamond wheel should advance to the chamfering starting point, and should stop at the exact 0 position. The operator makes the wheel head advance, and makes the rotary suction table revolve, while also making the lateral face of the chamfering starting point of the glass sheet contact with the two sensing rollers 22 prefer to FIG. 9A).

Figure 9B:
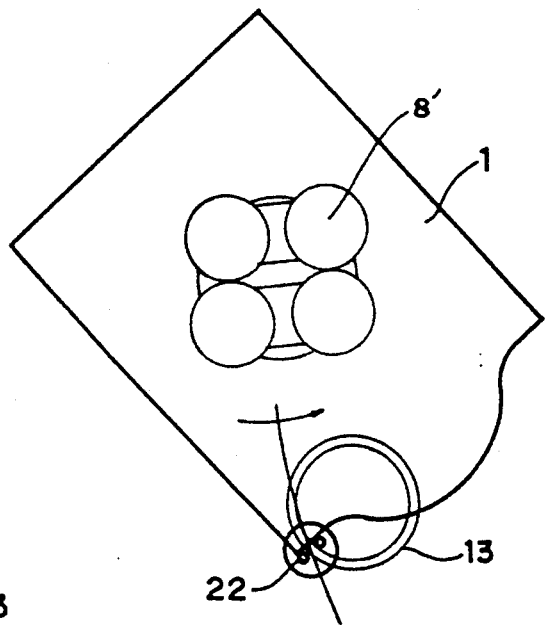

(2) When the two sensing rollers 22 contact the lateral face of the chamfering starting point in parallel with it (refer to FIG. 9B), the revolution of the rotary suction table is made to stop. Then the pneumatic pressure is supplied to the pneumatic cylinder 28 of the horizontal supporting pad 20 by pressing the button switch 55 which is for temporarily fixing the glass sheet shape sensing device which is positioned near the handle 56 of the vertical supporting bar 14. Then the rod 29 of the pneumatic cylinder 28 ascends to press and fix the end portion 25a of the adjusting key 25. Accordingly, the adjusting key 25 cannot move, and therefore, the glass sheet shape sensing device 19 cannot revolve but is fixed.

(3) After fixing the glass sheet shape sensing device 19, the rotary suction table 8 is slowly reversely rotated. When the chamfering starting point of the glass sheet contacts with only one of the sensing rollers (FIG. 9C), the reverse rotation of the table is stopped. Then the reset button is Dressed, so that the numeric display panel 40 should be cleared to "0000". In this state, if the table is forwardly rotated, the numeric display panel 40 of the counter will show a continuous increase of the numeric value from "0".

Figure 9C:
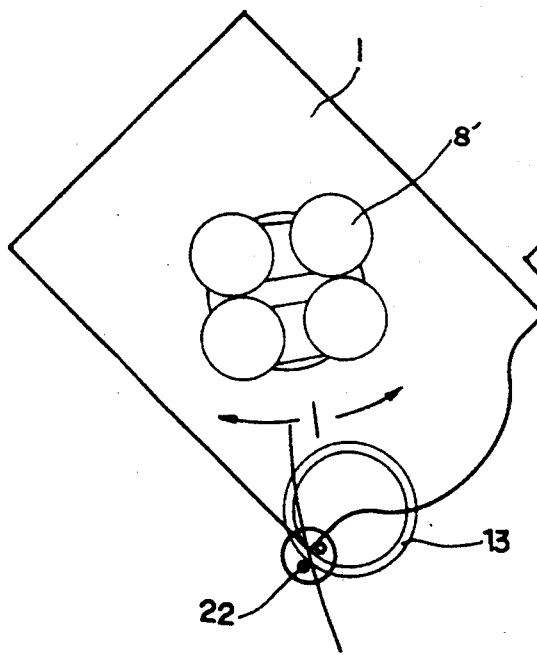
Figure 9D:
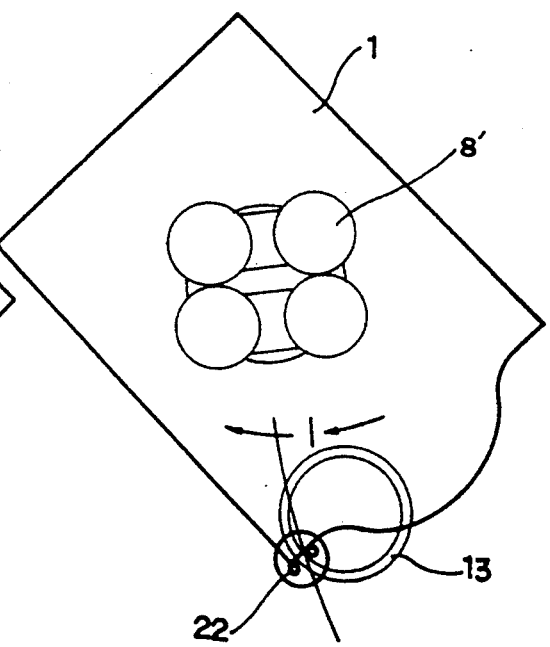
Figure 9E:
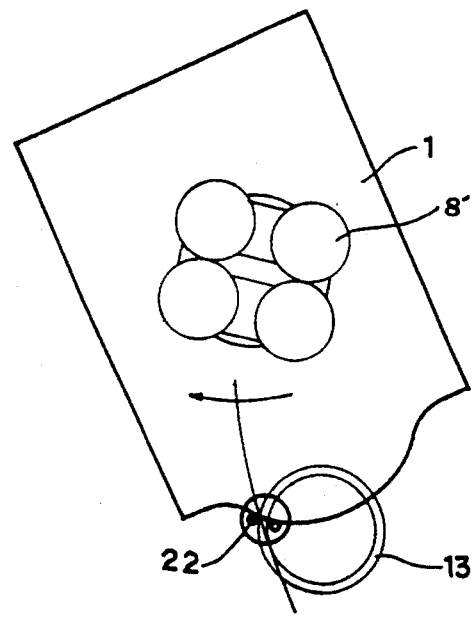
Figure 10:
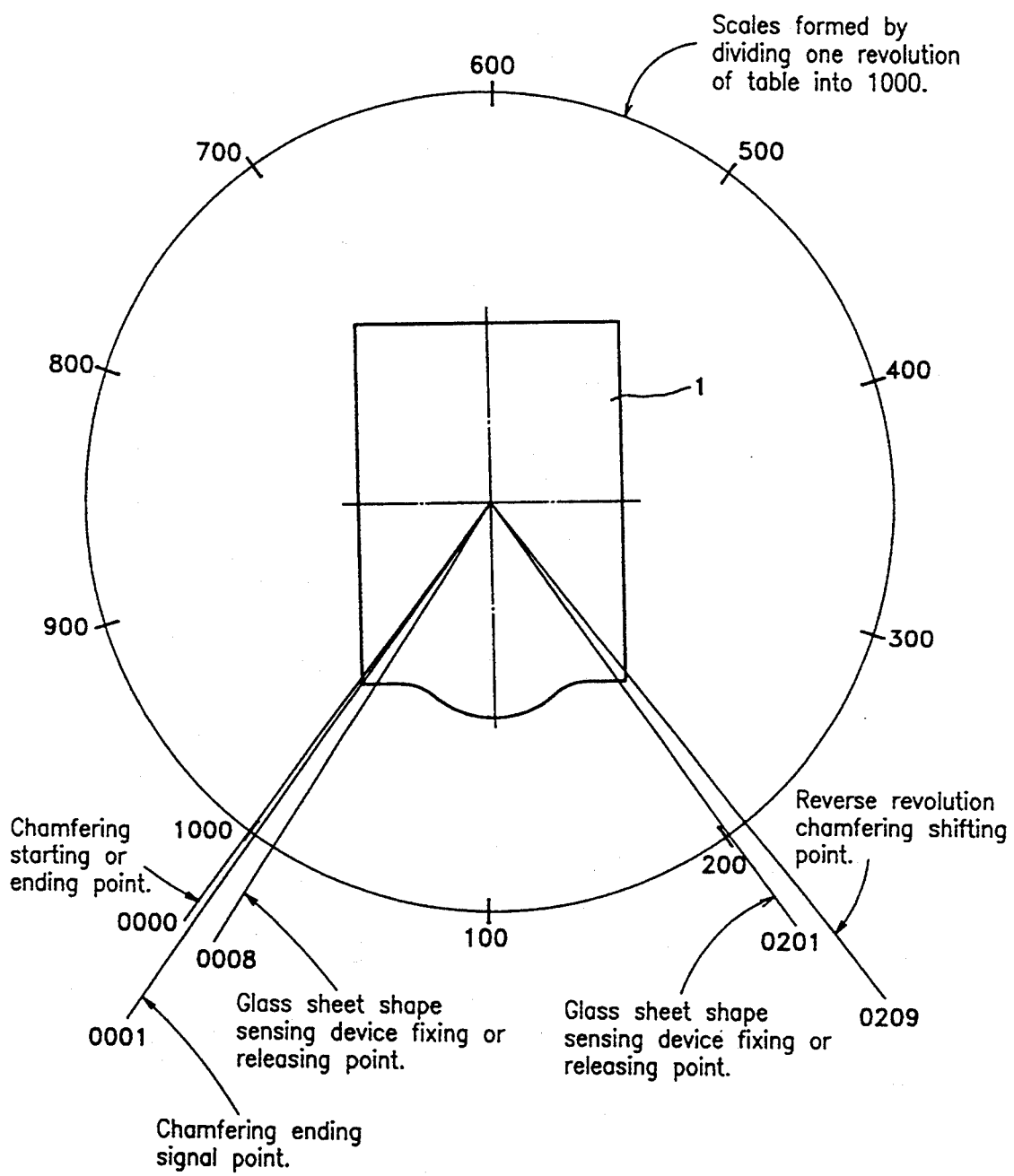
FIG. 10 illustrates the angular scales of the rotary suction table in which one rotation of the rotary suction table is divided into 1000.

(4) The forward rotation of the table is slowly carried out, and, when the two sensing rollers 22 contact with the lateral face of the chamfering starting point (FIG. 9D), the numeric value "0008" (which represents the revolution angle of the table from the state of FIG. 9C to the state of FIG. 9D) (refer to FIG. 10) is inputted into the second numeric setting panel. Then the numeric value of the numeric display panel will correspond with the inputted value, and the counter 7 will output a signal to lower the rod 29 of the pneumatic cylinder 28, thereby releasing the adjusting key 25. Thereafter, if the rotary suction table is forwardly rotated, the sensing device 19 senses the shape of the glass sheet, so that the chamfering wheel head 10 should maintain the optimum advancing direction in an automatic manner (FIG. 9E). Under this condition, the numeric value of the counter is continuously incremented.

Figure 9F:
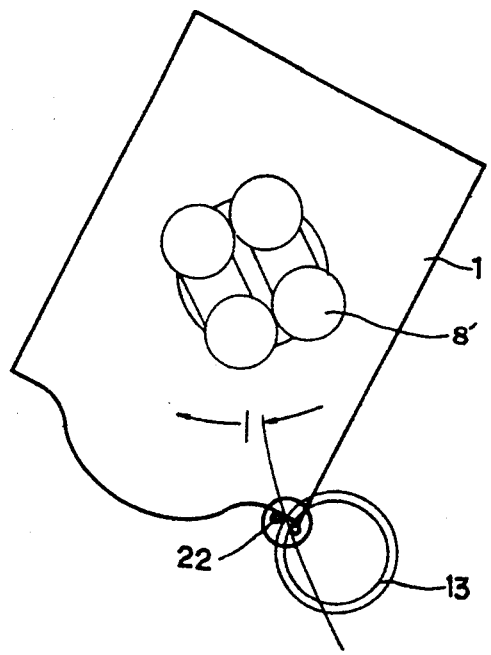

(5) When the two sensing rollers 22 reach the lateral face of the chamfering ending point of the glass sheet 1 (FIG. 9F), the forward rotation of the table is stopped, and the numeric value "0201" (which is the revolution angle of the glass sheet from the state of FIG. 9C to the state of FIG. 9F) (refer to FIG. 10) is inputted into the third numeric setting panel 43. Then the numeric value of the numeric display panel 40 and the numeric value of the numeric setting panel 43 will correspond with each other, and an output signal of the counter 7 will be sent to the pneumatic cylinder 28 to supply a pneumatic pressure to the cylinder 28. Thus in the same manner as described above, the adjusting key 25 is fixed, resulting in that the glass sheet shape sensing device 19 should be fixed again.

Figure 9G:
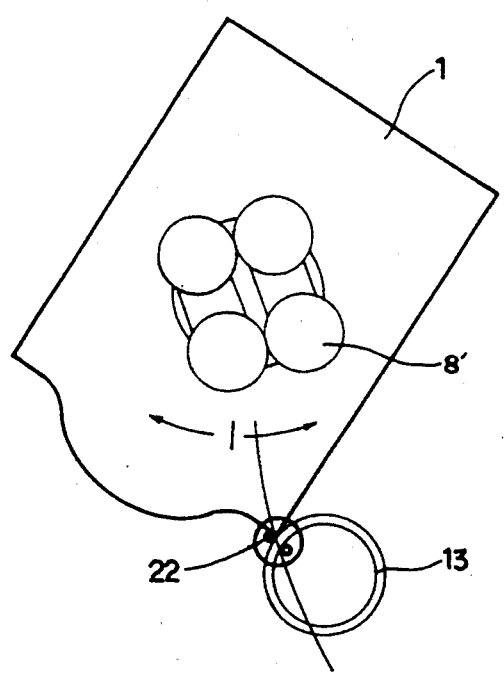

(6) The glass sheet 1 is rotated again until one of the two sensing rollers arrives at the chamfering ending point E (FIG. 9G). Then the forward rotation of it is temporarily stopped, and numeric value "0209" of the counter is inputted into the fourth numeric setting panel 44. The numeric value of the numeric display panel and the numeric value of the numeric setting panel will correspond with each other. Then the rotary suction table automatically reversely revolves, and the numeric value of the counter will be decremented from the peak value of "0209", the operating procedure being to be automatically carried out from thereafter.

Figure 9H:
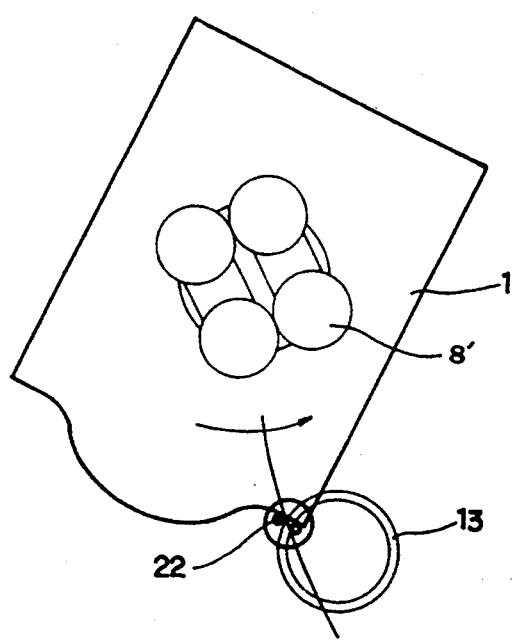
Figure 9I:
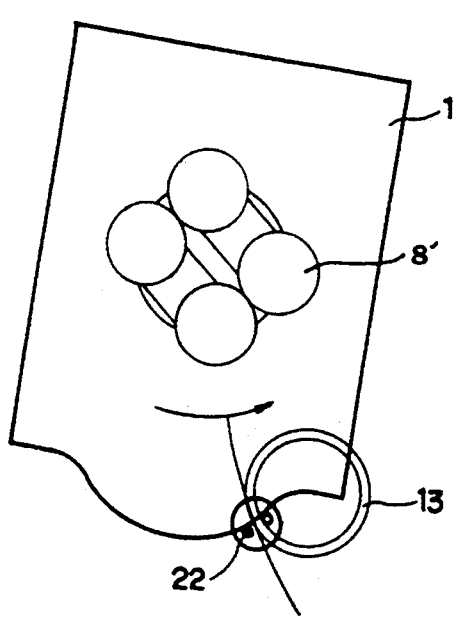

(7) Thus the reverse revolutions will be automatically carried out, and the numeric value of the counter will be continuously decremented. Thus if the lateral face of the chamfering ending point of the glass sheet arrives at the two sensing rollers (FIG. 9H), the numeric value of the counter becomes "0201" with the result that the value corresponds with the pre-set value "0201" of the third numeric setting panel. Then the rod 29 of the pneumatic cylinder 28 descends by an output signal of the counter, so that the adjusting key 25 should be released. Further, the glass sheet shape sensing device 19 is also released, with the result that the wheel head automatically maintains the optimum chamfering direction along the edge of the glass sheet to be chamfered by reversely moving (FIG. 9I), and that the numeric value of the counter is continuously decremented.

Figure 9J:
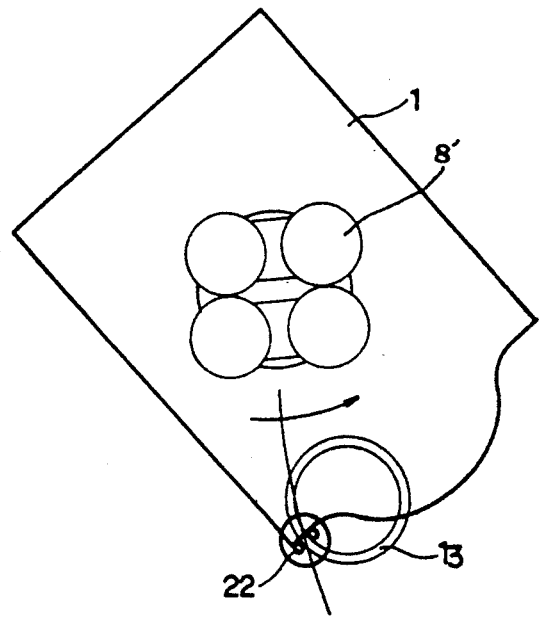

(8) Thus the reverse revolution is automatically carried out, and the numeric value of the counter 7 is continuously decremented. Thus when the lateral face of the chamfering starting point arrives at the two sensing rollers (FIG. 9J), the numeric value of the counter 7 becomes "0008", with the result that it corresponds with the pre-set numeric value "0008" of the second numeric setting panel 42. Then the counter 7 outputs a signal to activate the pneumatic cylinder 28 so as for the glass sheet shape sensing device 19 to be fixed in the above described manner, while the table performs continuous reverse revolutions.

Figure 9K:
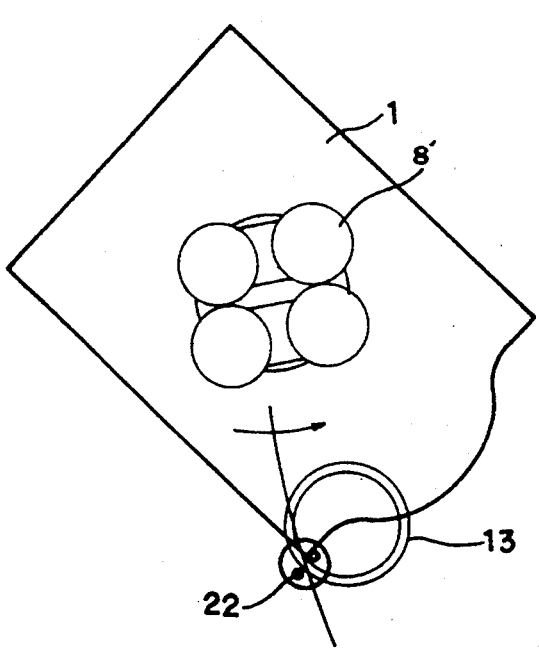
Figure 9L:
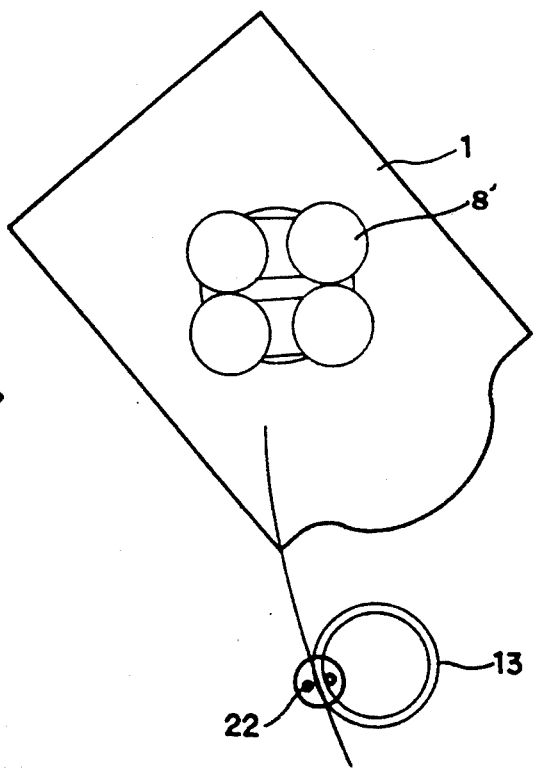

(9) The numeric value of the counter 7 will be continuously decremented, until only one of the two sensing rollers arrives at the chamfering starting point S. Thereupon, the numeric value of the counter 7 will become "0001", and this value will correspond with the ore-set numeric value "0001". Then the rotary suction table 8 will stop its revolution, but owing to the inertia, the table will slightly further revolve until the numeric value of the counter becomes "0000". Therefore, the chamfering starting point of the Glass sheet will be stopped exactly at the chamfering starting point "0" of the chamfering wheel (FIG. 9K), while chamfering head 10 automatically withdraws to be put to a standby position (FIG. 9L).

(10) When the chamfering wheel head 10 withdraws and put to a standby position, the glass sheet shape sensing device 19 is continuously fixed. Thus the points such as the pre-set signal point "0001" for arriving at the exact chamfering starting point, the glass sheet shape sensing device fixing or releasing point "0008", the other shape sensing device fixing or releasing point "0201", and the reverse revolution chamfering shifting point "0209" are inputted respectively into the numeric setting panels 41, 42, 43 and 44.

Now the sequence for carrying out the automatic partial chamfering for the glass sheet will be described.

Figure 11I:
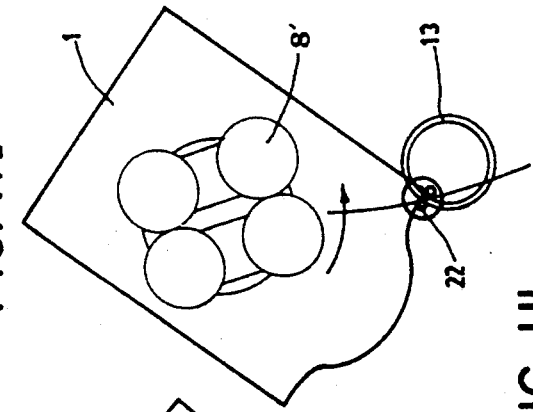
FIGS. 11A to 11P illustrates the procedure by which the glass sheet is automatically chamfered by the device of the present invention.

The operator first lowers the chamfering wheel motor 11 which has been raised, so that the chamfering wheel 13 should be able to chamfer the glass sheet. Then the operator holds the handle, and turns on an advancement switch. Then the wheel head will advance toward the glass sheet (refer to FIG. 11A). When only one of the sensing rollers contacts with the chamfering starting point of the glass sheet 1 (refer to FIG. 11B), the operator turns on the start switch, and releases the holding of the handle. Then the chamfering wheel motor 11 will revolve at a high speed, the cooling fluid will be supplied, and the rotary suction table 8 on which the glass sheet is mounted will be slowly forwardly rotated to start the bevel-chamfering. Meanwhile the numeric value of the counter will be incremented starting from "0000". Such operation and the operations to be described below are automatically carried out.

Thus the forward revolution chamfering is automatically carried out. Then, when the lateral face of the chamfering starting point of the glass sheet contacts with the two rollers 22 (refer to FIG. 11C), the numeric value of the counter will become "0008", so that the value should correspond with the pre-set numeric value "0008" of the second numeric setting panel. Thereupon, the counter emits an output electric signal to activate the pneumatic cylinder 28, so that the rod 29 which has been pressing the end portion 25a of the adjusting key 25 should be restored to the original position, thereby releasing the adjusting key 25. Accordingly, the glass sheet shape sensing device 19 which has been fixed is released, and accordingly, the chamfering wheel head 10 continues the forward revolution chamfering along the part of the edge of the glass sheet, while automatically maintaining the optimum chamfering advancing direction. Meanwhile, during this process, the numeric value is continuously incremented (refer to FIGS. 11D, 11E and 11F.

Figure 11L:
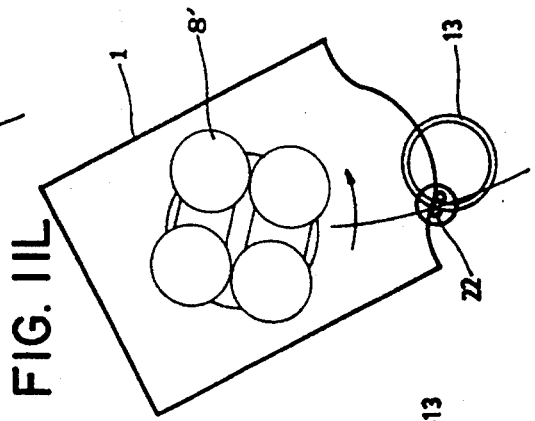
Figure 11H:
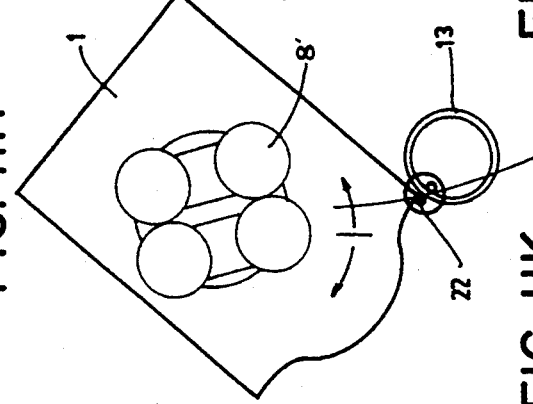
Figure 11K:
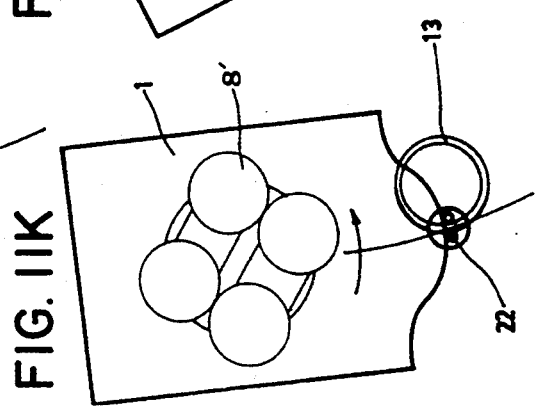
Figure 11G:
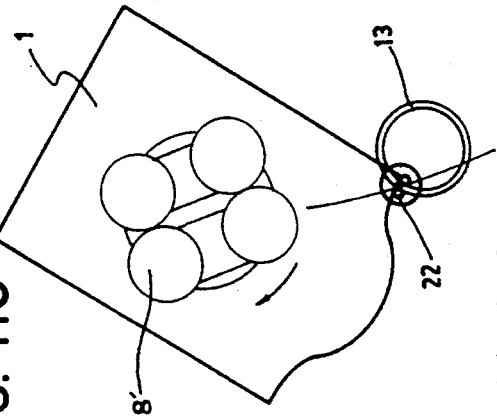

Thereafter, when the lateral face of the chamfering ending point of the glass sheet arrives at the two sensing rollers 22 (refer to FIG. 11G), the numeric value of the counter becomes "0201", so that this value should correspond with the pre-set numeric value of the third numeric setting panel. Then the counter emits an output electric signal to activate the pneumatic cylinder 28, so that the pneumatic cylinder 28 should press the adjusting key 25 by means of its rod 29. Consequently, the sensing device is fixed again, while the forward revolution chamfering is continued.

When the chamfering ending point of the glass sheet arrives at one of the sensing rollers (refer to FIG. 11H), the numeric value of the counter becomes "0209", so that this value should correspond with the pre-set numeric value of the fourth numeric setting panel 44. Then the rotary suction table 8 which has been revolving forwardly is shifted to a reverse revolution by an output signal of the counter to start a reverse revolution chamfering, while the numeric value of the counter is decremented from the peak value "0209".

Figure 11J:
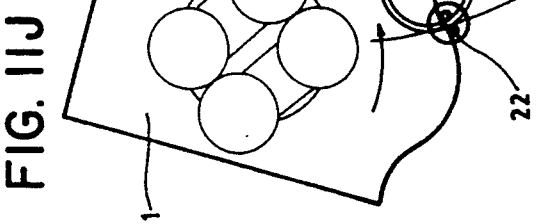

Again, when the lateral face of the chamfering ending point arrives at the two sensing rollers 22 (refer to FIG. 11I), the numeric value of the counter becomes "0201", so that this value should correspond with the pre-set value of the third numeric setting panel 43. The counter emits an output electric signal to activate the pneumatic cylinder 28 so that the adjusting key 25 should be released by the rod 29 of the pneumatic cylinder 28. Consequently, the chamfering wheel head 10 continues a reverse revolution chamfering, while automatically maintaining the optimum chamfering advancing direction (refer to FIGS. 11J, 11K and 11L).

Figure 11M:
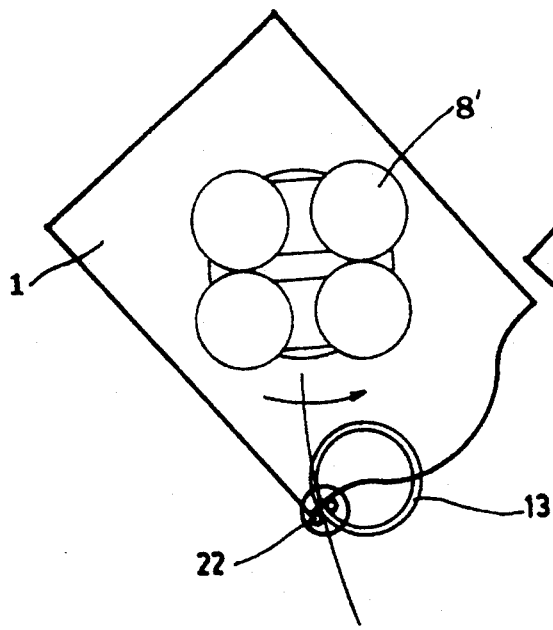

During the progress of the chamfering, the numeric value of the counter is decremented. When the lateral face of the chamfering starting point arrives at the two sensing rollers 22 (refer to FIG. 11M), the numeric value of the counter becomes "0008", so that this value should correspond with the pre-set numeric value of the second numeric setting panel 42. Then the counter emits an electric signal to activate the pneumatic cylinder 28, so that the sensing device 19 should be fixed by the rod 29 of the pneumatic cylinder 28. Thus the reverse revolution chamfering is carried out continuously.

Figure 11N:
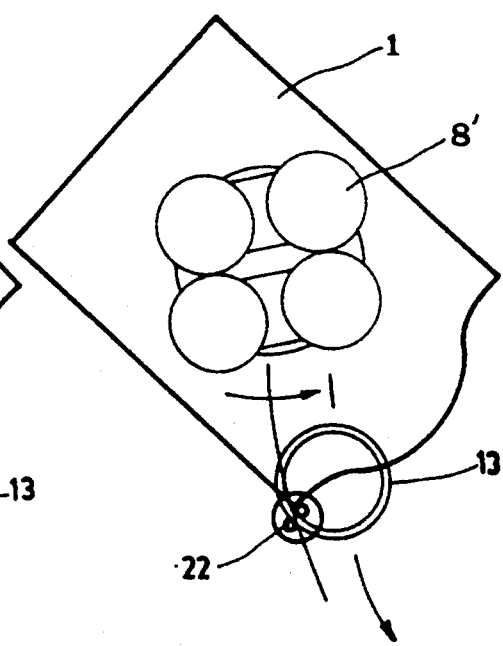
Figure 11O:
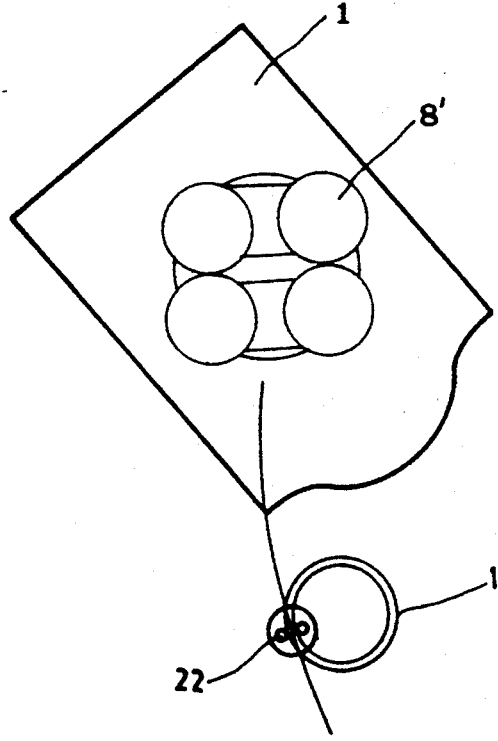

Thereafter, when the chamfering starting point of the glass sheet arrives at only one of the two sensing rollers (refer to FIG. 11N), the numeric value of the counter becomes "0001", so that this value should correspond with the pre-set numeric value of the first numeric setting panel. Then the rotation of the rotary suction table 8 stops by an electric output signal of the counter. However, owing to the inertia, the table revolves slightly further, until the numeric value of the counter becomes "0000". Consequently, the chamfering starting point of the glass sheet 1 stops exactly at the chamfering starting point of the chamfering wheel. At the same time, the revolution of the chamfering wheel motor 11 also stops, and the supply of the cooling fluid is halted, while the wheel head withdraws to a standby position (refer to FIG. 11(O)).

Figure 11P:
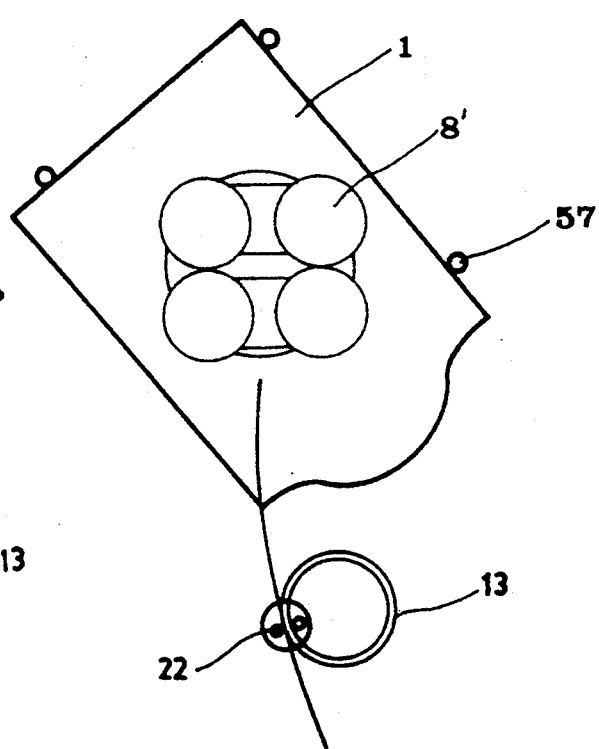

Thus the crude bevel-chamfering is automatically completed. The wheel head withdraws to the standby position, and the operator replaces the crude chamfering wheel with a medium crude chamfering wheel. Then the operator makes the wheel head advance toward the glass sheet to contact with the chamfering starting point. Then if the start switch is turned on, then all the operations are automatically carried out. After the completion of the medium crude chamfering, the medium crude chamfering wheel is replaced with a fine chamfering wheel, and a fine chamfering operation is automatically carried out. After the completion of the fine chamfering operation, the fine chamfering wheel is replaced with a fine grinding wheel, and a fine grinding operation is automatically carried out in the above described manner, thereby completing the whole process of chamfering. In the case where uniform sized glass sheets are repeatedly chamfered as shown in FIG. 11P, stoppers 57 are installed on the three straight lines. If every glass sheet is fitted to the stoppers, then the chamfering starting points of the glass sheets are always corresponded with the chamfering starting point of the chamfering wheel, so that the repetition of the chamfering of the glass sheets can be continuously carried out with one numeric input.

According to the present invention as described above, the adjusting key 25 having the handle 25b and the end portion 25a is fixedly installed on the circular supporting base on which the two glass sheet shape sensing rollers are installed. Further the horizontal supporting pad 20 is provided with the adjusting key control plate 26 and a pneumatic cylinder 28, so that the pneumatic cylinder 28 can be actuated by the numeric values of the counter, and that the glass sheet shape sensing device 19 can be properly controlled, thereby carrying out the chamfering operation. Consequently, the defect rate is greatly reduced, and the manual adjustments at the respective chamfering steps are not required, but the adjustments and the chamfering are automatically carried out.

What is claimed is:

1. A glass sheet partial chamfering machine comprising: a rotary suction table installed upon a base body; a horizontal beam extending from the top of said base body; a vertical pole upstanding at the end of said horizontal beam; first and second joint beams sequentially connected to the top of said vertical pole; a wheel motor with a chamfering wheel attached thereon, and suspended from the end of said second joint beam; said rotary suction table with a glass sheet mounted thereon slowly revolving; and said wheel motor being driven at a high speed for bevel-chamfering said glass sheet, the glass sheet partial chamfering machine further comprising: a horizontal supporting pad mounted to said second joint beam; and an adjusting key control plate affixed to said horizontal supporting pad, said control plate having a guide slot therein and a rod insertion hole opening into said guide slot;

a supporting base pivotally mounted to said horizontal supporting pad; and an adjusting key affixed to said supporting base, said adjusting key having an end portion in said guide slot;

a pneumatic cylinder affixed to said horizontal supporting pad, said cylinder having an actuating rod positioned to access said rod insertion hole; and a counter for numeric controlling said pneumatic cylinder to actuate said rod into said rod insertion hole at predetermined counter positions.

2. The glass sheet partial chamfering machine as claimed in claim 1, wherein said counter is provided with four numeric setting panels into which numeric values of revolution angles for such as chamfering starting and ending points, fixing and releasing points for said glass sheet shape sensing device, and chamfering advancing reversing points are pre-set, so that, when displayed numeric values and the pre-set values correspond with each other as the result of the revolution of said rotary suction table, the chamfering machine is properly controlled to automatically carry out the partial chamfering for said glass sheet.

3. The glass sheet partial chamfering machine as claimed in claim 1, wherein, when the glass sheet secured on said rotary suction table finishes the partial bevel-chamfering in the clockwise direction, the glass sheet automatically reverses its revolution to anticlockwise, thereby carrying out the chamfering in an automatic manner.

* * * * *